W. I. SEYMOUR.
METHOD OF MAKING LENS BLANKS.
APPLICATION FILED MAY 4, 1909.
1,026,182.
Patented May 14, 1912.
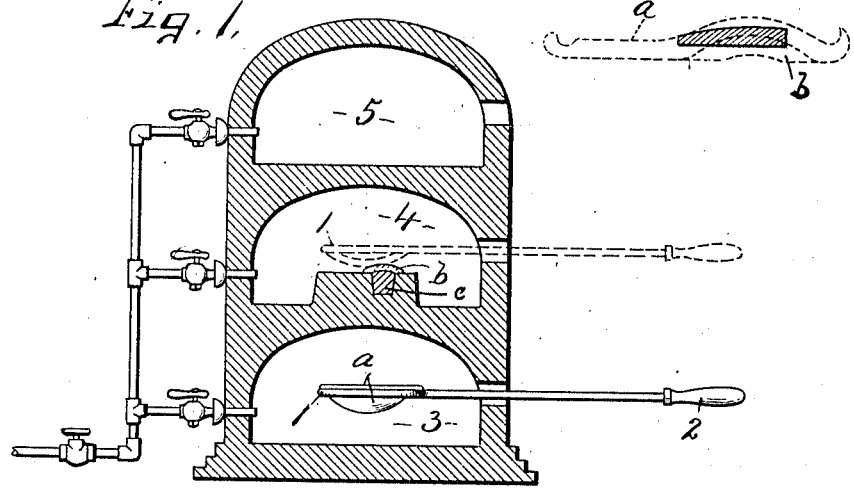
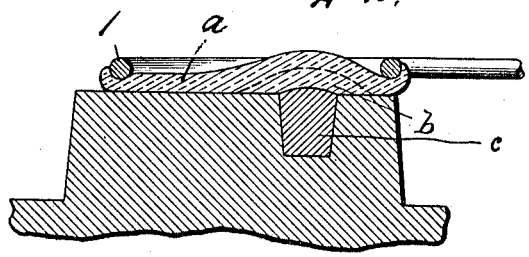
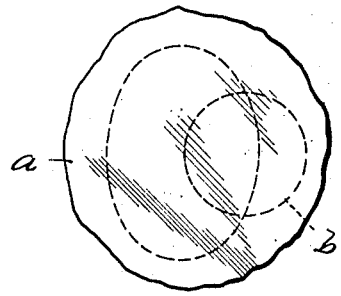
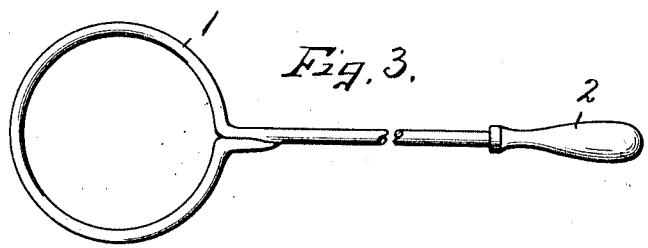
Witnesses.
Inventor.
W. I. Seymour
By Howard P. Denison
Attorney.

UNITED STATES PATENT OFFICE.

WALTER I. SEYMOUR, OF CHICAGO, ILLINOIS, ASSIGNOR, BY MESNE ASSIGNMENTS, TO UNITED BIFOCAL COMPANY, OF NEW YORK, N. Y., A CORPORATION OF NEW YORK.

METHOD OF MAKING LENS-BLANKS.

1,026,182. Specification of Letters Patent. Patented May 14, 1912.

Application filed May 4, 1909. Serial No. 493,974.

*To all whom it may concern:*

Be it known that I, WALTER I. SEYMOUR, of Chicago, in the county of Cook, in the State of Illinois, have invented new and useful Improvements in Methods of Making Lens-Blanks, of which the following, taken in connection with the accompanying drawings, is a full, clear, and exact description.

This invention relates to an improved method of making lens blanks and refers more particularly to the method of uniting the glass sections to form the blank from which the bifocal lens is cut. These glass sections are necessarily of widely different densities, the larger section or main body being made of what is commonly known as "crown" glass which is of comparatively light density, while the smaller section commonly known as "lead" glass is of much greater density.

I am aware that the sections of bifocal lenses have been heretofore united or secured together by placing one of the sections, as the smaller section, in a previously ground seat in the larger section and then subjecting both sections to a sufficient degree of heat to cause the two sections to unite by welding. That is, both sections are subjected to a degree of heat sufficiently high to reduce the smaller section of greatest density to a semi-molten condition, which manifestly produces excessive expansion of the larger or less dense section. The expansion of both sections under this same degree of heat, is therefore, unequal and conversely the contraction upon cooling of the united sections is also unequal, thereby producing excessive strains at the junction of the united sections which frequently cause the lenses to break during the process of grinding, and even if the lens is mechanically perfect after grinding this unequal contraction is always liable to produce more or less aberration in the finished lens. Under this method both lens sections are simultaneously subjected to the same gradual increasing temperature sufficient to bring about their welding one with the other, which, aside from the optical imperfections, necessitates previous preparation or grinding of one section to receive the other and also results in excessive loss of time, labor and material through breakage during the process of grinding due to unequal shrinkage or contraction of the sections.

My main object is to render the process more certain in its results so as to reduce to a minimum the loss of time, labor and material incidental to the manufacture of this class of lenses, and at the same time to produce a more perfect bifocal lens than has heretofore been obtained.

Another object is to permit the use of the raw material or glass having a good finished surface just as it comes from the glass manufacturers' hands without any special grinding or preparation.

In the drawings—Figure 1 is a sectional view of a series of, in this instance, three ovens or furnaces disposed one above the other, showing the several steps in the process of reducing the lens blank sections to certain degrees of plasticity under different temperatures and for annealing or tempering the completed lens blank. Fig. 2 is an enlarged elevation of the form upon which the sections are temporarily supported while uniting. Fig. 3 is a top plan of the supporting member for manipulating the crown glass while being softened under heat. Fig. 4 is a plan of the unitary bifocal lens blank after the sections have been united by welding, the dotted circle showing the position of the denser section and the elliptical dotted lines indicating the lens to be cut from the blank. Fig. 5 is a sectional view of the finished lens as cut from the lens blank which is shown by dotted lines.

This process briefly described consists in separately reducing the glass sections of different densities to suitable degrees of pliability or plasticity by heat under different degrees of temperature and then applying one section to the other upon a suitable form, whereby the sections become welded into a homogeneous unit which is allowed to gradually cool, or may be subjected to a lower tempering heat to further perfect its mechanical and optical qualities. In other words I have sought to give the lead glass or section of greater density a fixed or definite curve or form by reducing it to a plastic state upon a predetermined contour and then placing the separately plasticized crown glass upon the curved lead glass and allowing them to gradually weld together only after being brought to their maximum degree of heat separately, thereby reversing the present method by establishing the proper curve at the uniting point by the mere application of one plastic section to the other section and obviating the necessity for previously grinding one of the sections to receive the other section.

In carrying out this process I select a piece of smooth or polished crown or lime glass —a— preferably as it comes from the glass manufacturer's hands and of suitable size to form the body of the lens. For example, about 2 or 3 inches in diameter and from ¼ to ½ of an inch thick, as may be desired. This crown glass is then placed upon a suitable support, as a ring —1—, of sufficient diameter to receive and support the edges of the glass, leaving the center exposed through the opening of the ring, said ring being provided with a handle —2— of sufficient length to permit the ring with the glass thereon to be easily and conveniently inserted and manipulated in an oven or furnace —3— where the glass is soon reduced to a plastic or semi-molten condition, the edges of the glass readily adhering to the ring so as to permit the glass to be turned or manipulated in the furnace to more quickly and uniformly reduce it to a state of plasticity. This crown glass is subjected to a comparatively high temperature sufficient to render it soft or pliant without destroying its integrity or causing it to flow from the iron ring. During the reduction of the crown glass to this state of plasticity a suitable piece of smooth or polished lead glass —b— of greater density is placed upon a mold or form c having a polished surface of curved or other suitable predetermined contour within an adjacent, in this instance, superposed furnace or oven —4— in which a degree of temperature somewhat lower than that in furnace —3— is maintained, such temperature being sufficient to soften the lead glass and cause it to assume the complementary form of the iron mold upon which it rests. As soon as the lead glass has assumed this form, the highly heated crown or lime glass is taken quickly from the hotter furnace and placed upon the disk of lead glass in such manner that it immediately welds with and takes the complementary form of the lead glass which is lying on the form or solid base, thereby forming the two pieces into a homogeneous unit, whereupon the united sections may be allowed to gradually cool, either by cutting off the heat or by removing the lens blank from the furnace; or if desired such lens blank may be removed from the furnace —4— and re-inserted into an annealing or tempering oven —5— for further treating the lens blank to improve its mechanical and optical qualities. After the lens blank is sufficiently cool, it may be cut and ground in the usual manner for making the desired bifocal lens. It will be observed that the main feature of the invention, however, lies in the separate treatment of the two lens blank sections under different degrees of temperature and then applying one to the other upon a suitable form or contour whereby they may become welded into a unitary homogeneous unit ready to be cut and ground for use.

One advantage of this process not present in those now in general use for making bifocal lens blanks is that ordinary pieces of polished or ground glass as it comes from the manufacturer's hands may be employed without previous grinding or fitting. Another advantage of separately heating the lens blank sections and applying them one to the other after being reduced to a softened condition is that of welding together uniformly through their entire contact areas, thereby removing any visible line of joining and at the same time obviating any liability of unequal expansion or contraction, and thus preventing optical aberrations, and also reducing the loss from breakages to a minimum.

It may be stated here that when the two sections are united by welding and the completed lens blank is withdrawn from the oven, it may be readily separated from the iron ring by slightly tapping the latter to break the adhesion between the glass and its support.

It may be found best to slightly cool the lead glass after it has formed itself to the shaping plug or mold before uniting the crown glass to it, and again the heating or softening of the two glasses separately allows the surfaces to take on refinish or repolish in such a manner that when united any slight imperfection which may have existed in the original surfaces are more likely to be made perfect than would be the case were the two lying in contact at the time they were heated.

What I claim is—

1. The herein described method of making bifocal lens blanks consisting in heating a piece of lead glass on a convex form to softness so as to assume such form, then heating a piece of crown glass to a greater degree and applying it to the softened lead glass while still on the form so as to assume the complementary form and unite with the lead glass, then removing the united body and allowing it to cool.

2. The herein described method of making bifocal lens blanks consisting in heating a piece of glass to softness on a convex form so as to assume a complementary form, separately heating another piece of glass of different density to softness and causing a portion thereof to assume a concavo-convex form, then bringing the second named softened glass into position so that its convex side will rest and settle upon the convex side of the first named softened glass while still under heat on the form to unite said pieces, and finally withdrawing the united body and allowing it to cool.

3. The herein described method of making lens blanks consisting in giving a definite curve to a piece of glass while softened by heat, and applying another piece of heat-softened glass to the convex surface of the first named piece while the latter is still heated to softness to unite said pieces and then withdrawing such body and allowing it to cool.

4. The herein described method of making lens blanks consisting in giving a definite curve to a piece of glass while softened by heat, and applying another piece of heat-softened glass of different density to the curved surface of the first named piece while the latter is still heated to softness until the adjacent surfaces are welded and then removing the united body and allowing it to cool.

5. The herein described method of making lens blanks consisting in giving a definite curve to a piece of glass while softened by heat, then separately heating another piece of glass of different density to softness and impressing it onto the previously curved piece while the latter is still in a softened condition to weld the adjacent surfaces together and form the blank and then removing the blank and allowing it to cool.

6. The herein described method of making lens blanks consisting in deforming a portion of a softened body of glass of one kind or index to a predetermined contour and afterward applying another body of softened glass of different kind or index to one of the deformed surfaces of the first-named body while both bodies are softened and welding the contiguous faces of said bodies together.

In witness whereof I have hereunto set my hand this 24th day of April 1909.

WALTER I. SEYMOUR.

Witnesses:
ROBERT E. BARBER,
VESTA K. CRONE.